United States Patent
Ikeda et al.

(10) Patent No.: US 12,515,492 B2
(45) Date of Patent: Jan. 6, 2026

(54) NOISE SUPPRESSION STRUCTURE IN COOLING SYSTEM FOR ELECTRICAL DEVICE

(71) Applicant: SUBARU CORPORATION, Tokyo (JP)

(72) Inventors: Shunsuke Ikeda, Tokyo (JP); Shinichi Kimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 471 days.

(21) Appl. No.: 17/858,517

(22) Filed: Jul. 6, 2022

(65) Prior Publication Data
US 2023/0021712 A1    Jan. 26, 2023

(30) Foreign Application Priority Data
Jul. 26, 2021 (JP) .................................. 2021-121594

(51) Int. Cl.
B60H 1/00 (2006.01)

(52) U.S. Cl.
CPC ..... B60H 1/00507 (2013.01); B60H 1/00385 (2013.01); B60H 2001/006 (2013.01)

(58) Field of Classification Search
CPC ............ B60H 1/00507; B60H 1/00385; B60H 2001/006
USPC ........................................................ 454/139
See application file for complete search history.

(56) References Cited

U.S. PATENT DOCUMENTS

| | | | |
|---|---|---|---|
| 8,567,543 B2 * | 10/2013 | Kubota | B60L 58/26 180/68.5 |
| 10,071,699 B2 * | 9/2018 | Tanahashi | H05K 7/1432 |
| 2008/0017262 A1 | 1/2008 | Higashino et al. | |
| 2012/0181827 A1 * | 7/2012 | Aoki | B60K 1/04 297/217.3 |
| 2016/0137094 A1 * | 5/2016 | Yoda | B60K 1/04 454/108 |

(Continued)

FOREIGN PATENT DOCUMENTS

| | | |
|---|---|---|
| JP | 2008-14565 A | 1/2008 |
| JP | 2010-145003 A | 7/2010 |
| JP | 6389953 B2 | 9/2018 |

OTHER PUBLICATIONS

Japanese Office Action dated Jun. 10, 2025 in Japanese Patent Application No. 2021-121594 with English machine translation.

*Primary Examiner* — Avinash A Savani
*Assistant Examiner* — Dana K Tighe
(74) *Attorney, Agent, or Firm* — McGinn I.P.Law Group, PLLC (57) ABSTRACT

A noise suppression structure to be mounted on a cooling system for an electrical device of a vehicle includes a duct, a blower, and a sound absorber. The duct extends from inside a vehicle cabin of the vehicle to inside the vehicle cabin or outside the vehicle cabin through the electrical device. The blower is configured to draw air from the vehicle cabin into the duct and feed the air to the electrical device. The sound absorber is disposed in the duct. The duct has a curved portion where an extension direction of the duct changes. The curved portion is located on one of or each of an upstream side and a downstream side of the electrical device. The sound absorber is disposed in a fluid stagnation region where a flow of the air tends to stagnate in the curved portion.

20 Claims, 5 Drawing Sheets

(56) References Cited

U.S. PATENT DOCUMENTS

2018/0050606 A1 2/2018 Sugitate et al.
2019/0210483 A1 7/2019 Sugitate et al.

* cited by examiner

NOISE SUPPRESSION STRUCTURE IN COOLING SYSTEM FOR ELECTRICAL DEVICE

CROSS-REFERENCE TO RELATED APPLICATIONS

The present application claims priority from Japanese Patent Application No. 2021-121594 filed on Jul. 26, 2021, the entire contents of which are hereby incorporated by reference.

BACKGROUND

The disclosure relates to a noise suppression structure that suppresses propagation of high-frequency noise generated by an electrical device mounted on a vehicle into a vehicle cabin, in a cooling system that cools the electrical device.

An electric vehicle such as an electric vehicle or a hybrid vehicle includes on-board electrical devices such as a driving battery and a power converter. Since an excessive rise in a temperature of each of these electrical devices causes a reduction in performance and a shorter life of the electrical device, the vehicle includes an on-board cooling system that cools the electrical devices.

From the viewpoint of layout, the electrical devices are often disposed near a vehicle cabin of the electric vehicle. The cooling system for the electrical devices is configured so that a cooling fan draws air from the vehicle cabin into an intake duct and feeds the air to the electrical devices. The air that has passed through the electrical devices is discharged either outside or inside the vehicle cabin via an exhaust duct.

The electrical devices generate high-frequency noise in operation. In the cooling system, the high-frequency noise generated from the electrical devices is propagated into the vehicle cabin via the duct. If the propagated high-frequency noise reaches the ears of a passenger, the passenger may feel uncomfortable.

There is a known technique for absorbing noise by providing a sound absorber in such a duct to suppress propagation of the noise via the duct.

For example, Japanese Unexamined Patent Application Publication (JP-A) No. 2010-145003 discloses a noise suppression structure including a sound absorber that is bonded to part of an inner wall surface of a duct. The duct has a linear portion where an internal passage extends linearly and curved portions where the passage is curved. The sound absorber is disposed in the linear portion formed between the two curved portions and protrudes into the passage.

Furthermore, a noise suppression structure disclosed in Japanese Patent No. 6389953 has a recessed portion that is formed in part of an inner wall surface of a duct, and a sound absorber is accommodated in this recessed portion.

These noise suppression structures each enable the sound absorber disposed in the duct to absorb the high-frequency noise generated by an electrical device and thus can reduce the noise propagated into the vehicle cabin via the duct.

SUMMARY

An aspect of the disclosure provides a noise suppression structure to be mounted on a cooling system for an electrical device of a vehicle. The noise suppression structure includes a duct, a blower, and a sound absorber. The duct extends from inside a vehicle cabin of the vehicle to inside the vehicle cabin or outside the vehicle cabin through the electrical device. The blower is configured to draw air from the vehicle cabin into the duct and feed the air to the electrical device. The sound absorber is disposed in the duct. The duct has a curved portion where an extension direction of the duct changes. The curved portion is located on one of or each of an upstream side and a downstream side of the electrical device. The sound absorber is disposed in a fluid stagnation region where a flow of the air tends to stagnate in the curved portion.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

In the noise suppression structure disclosed in JP-A No. 2010-145003, the sound absorber is disposed in the duct extending linearly and protrudes into the passage. Therefore, a mainstream of the air flowing in the duct strikes the sound absorber, and the sound absorber disturbs cooling air, resulting in a reduction in the cooling performance for cooling the electrical device.

On the other hand, in the noise suppression structure disclosed in Japanese Patent No. 6389953, the sound absorber is disposed in the recessed portion formed on a wall surface of the duct. Therefore, it is possible to maintain a cooling performance without disturbing a mainstream of the air by the sound absorber.

However, it is necessary to additionally provide the recessed portion in the duct. This increases a manufacturing cost, and increases the space for accommodating the duct in the vehicle, resulting in a reduction in space efficiency when components are mounted.

The disclosure has been made in light of the above problems, and it is desirable to provide a noise suppression structure that is included in a cooling system for an electrical device and that can effectively absorb high-frequency noise while maintaining a cooling performance, reduce an increase in manufacturing cost, and improve space efficiency when components are mounted.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
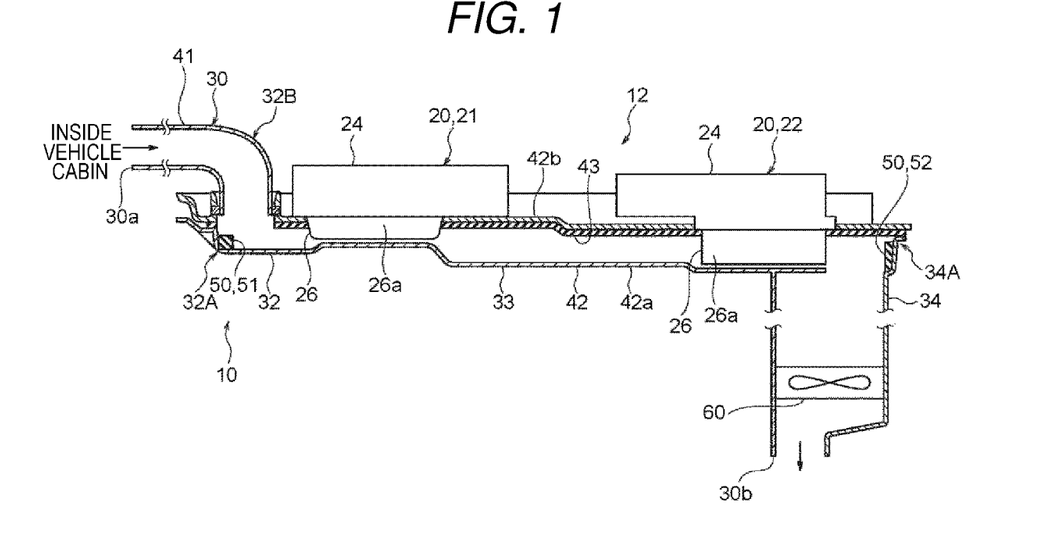
FIG. 1 is a schematic cross-sectional view illustrating a cooling system including a noise suppression structure for an electrical device according to an embodiment of the disclosure.
Figure 2:
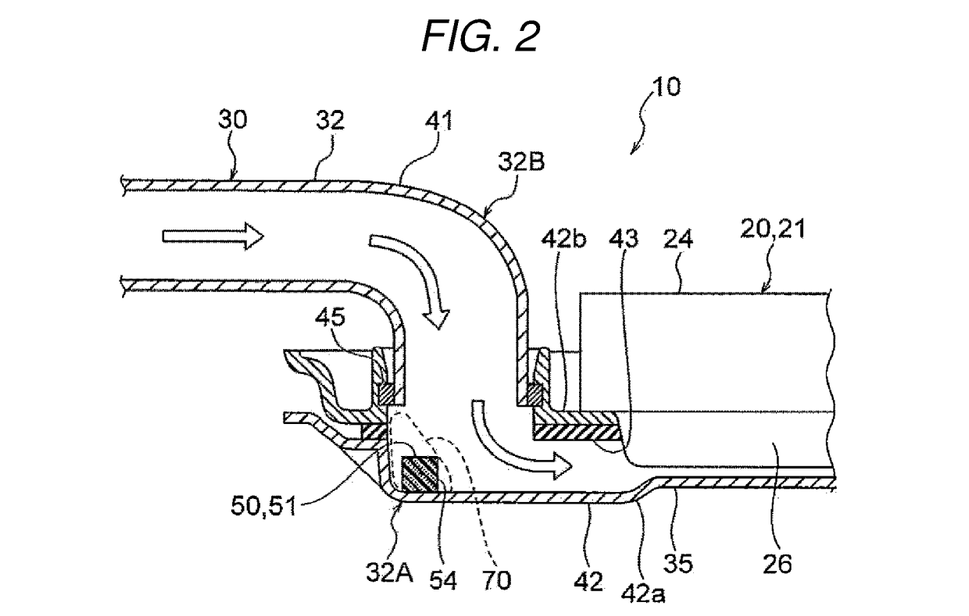
FIG. 2 is a cross-sectional view illustrating principal components of the noise suppression structure.
Figure 3:
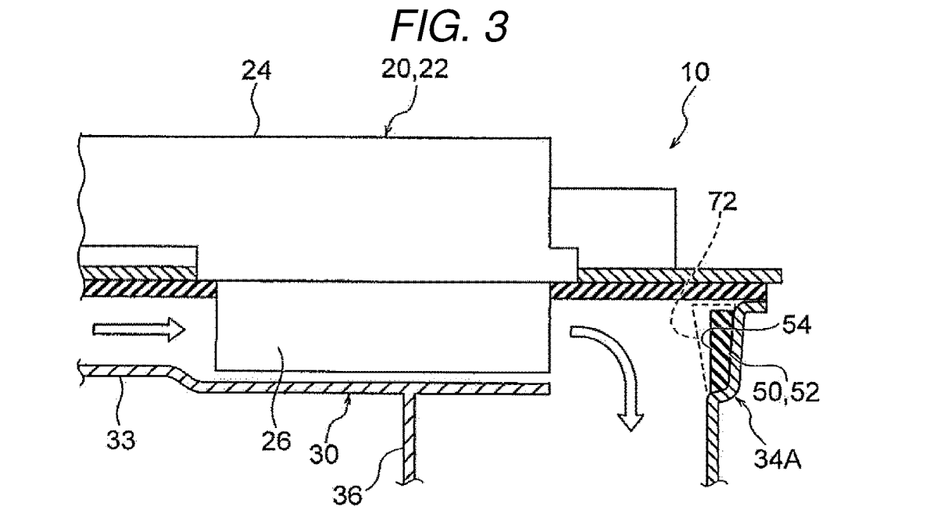
FIG. 3 is a cross-sectional view illustrating principal components of the noise suppression structure.

FIG. 1 is a schematic cross-sectional view illustrating a cooling system 12 including a noise suppression structure 10 for an electrical device 20 according to one embodiment of the disclosure, and FIGS. 2 and 3 are cross-sectional views illustrating principal components of the noise suppression structure 10 in the cooling system 12 illustrated in FIG. 1. The cooling system 12 is applied to a vehicle such as an electric vehicle or a hybrid vehicle and intended to cool the electrical device 20 mounted on the vehicle.

The cooling system 12 includes the electrical device 20, a duct 30 that allows communication among the inside of a vehicle cabin, the electrical device 20, and the outside of the vehicle cabin, a sound absorber 50 disposed in the duct 30, and a blower 60 configured to draw air from the vehicle cabin into the duct 30 and feed the air to the electrical device 20. This cooling system 12 allows the blower 60 to feed the air from the vehicle cabin via the duct 30 to the electrical device 20, and cools the electrical device 20.

The noise suppression structure 10 is configured so that the sound absorber 50 absorbs high-frequency noise generated by the electrical device 20 and intended to suppress propagation of the high-frequency noise into the vehicle cabin via the duct 30. The electrical device 20, the duct 30, the blower 60, and the sound absorber 50 that form the noise suppression structure 10 will now be described in detail.

The electrical device 20 is an electric device of any type mounted on the vehicle. Examples of the electrical device 20 include a driving battery, an inverter, and a converter for an electric vehicle. In the embodiment, the cooling system 12 cools a converter 21 and an inverter 22 that are electrical devices 20. The converter 21 and the inverter 22 each includes a device main body accommodated in a casing 24 and a heat dissipation fin 26 protruding outside the casing 24. In the drawings, the casing 24 is illustrated in a non-sectional manner. The heat dissipation fin 26 has a plurality of flat protrusions 26a disposed in parallel at predetermined intervals. In the heat dissipation fin 26 illustrated in FIG. 1, the protrusions 26a are disposed in parallel at predetermined intervals from the near side to the far side of the paper surface.

The duct 30 includes an intake duct 32 that extends from inside the vehicle cabin to the electrical device 20, and an exhaust duct 34 that extends from the electrical device 20 to inside the vehicle cabin or outside the vehicle cabin. In the embodiment, an end opening of the duct 30 is disposed in the vehicle cabin, and this end opening forms an intake port 30a of the duct 30. Another end opening of the duct 30 is disposed outside the vehicle cabin, and this end opening forms an exhaust port 30b of the duct 30. The intake duct 32 forms an intake passage through which the air drawn into the duct 30 from the intake port 30a is fed to the electrical device 20, while the exhaust duct 34 forms an exhaust passage through which the air having passed through the electrical device 20 is discharged from the exhaust port 30b to outside the vehicle cabin.

In the embodiment, the converter 21 and the inverter 22 are disposed apart in series in a connecting duct 35 that allows communication between a downstream end of the intake duct 32 and an upstream end of the exhaust duct 34. The connecting duct 35 extends linearly. The converter 21 and the inverter 22 are each installed so that the casing 24 is disposed outside the duct 30 and the heat dissipation fin 26 is disposed inside the duct 30.

The intake duct 32 and the exhaust duct 34 of the duct 30 have curved portions 32A and 32B and a curved portion 34A, respectively, where an extension direction of the duct 30 changes. In FIG. 1, the first upstream curved portion 32A and the second upstream curved portion 32B are disposed in this order from the electrical device 20 side in the intake duct 32, while the first downstream curved portion 34A is disposed at a position closest to the electrical device 20 in the exhaust duct 34.

The first upstream curved portion 32A and the first downstream curved portion 34A are bent portions where the extension direction of the duct 30 is bent. In the embodiment, the duct 30 is bent generally at a right angle in the curved portions 32A and 34A. The duct 30 is curved in the second upstream curved portion 32B.

Figure 4:
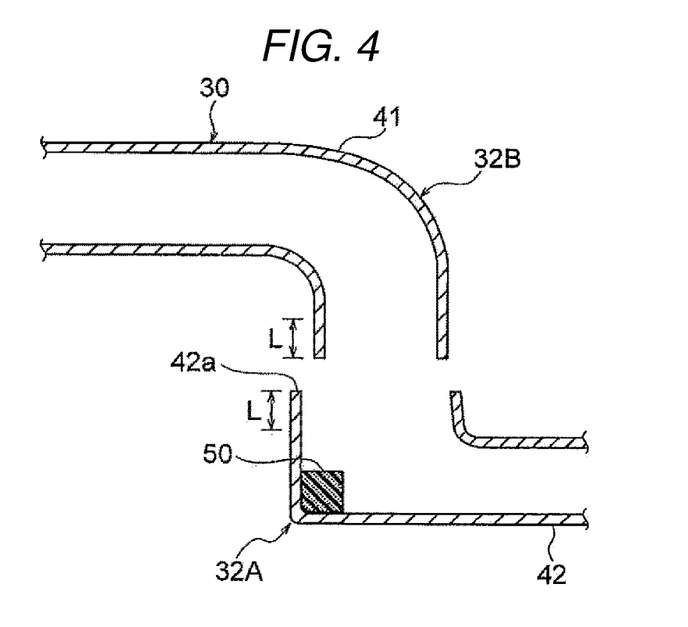
FIG. 4 is a cross-sectional view illustrating a structure of a duct and a position of a sound absorber.

The duct 30 is configured to be dividable into a plurality of components in a length direction. Desirably, the duct 30 can be divided into a plurality of components near the curved portions 32A and 34A where the sound absorbers 50 are disposed. In the embodiment, as illustrated in FIG. 4, the duct 30 is configured to be dividable into a first duct part 41 and a second duct part 42 near an upstream side of the first upstream curved portion 32A. In FIG. 4, the shape of the duct 30 is illustrated in a simplified manner to help understand the divided state. The first duct part 41 forms the second upstream curved portion 32B, while the second duct part 42 forms the first upstream curved portion 32A and the first downstream curved portion 34A. As illustrated in FIG. 2, the first duct part 41 and the second duct part 42 are coupled to each other with a seal member 45 interposed therebetween. In the embodiment, the first duct part 41 is coupled to the second duct part 42 in such a manner that an end of the first duct part 41 is fitted into an end of the second duct part 42. The duct parts 41 and 42 overlap at a joint radially by a predetermined length L. The sound absorber 50 is disposed at a position apart from an end opening of the second duct part 42 by a length equal to or greater than the predetermined length L.

Figure 5A:
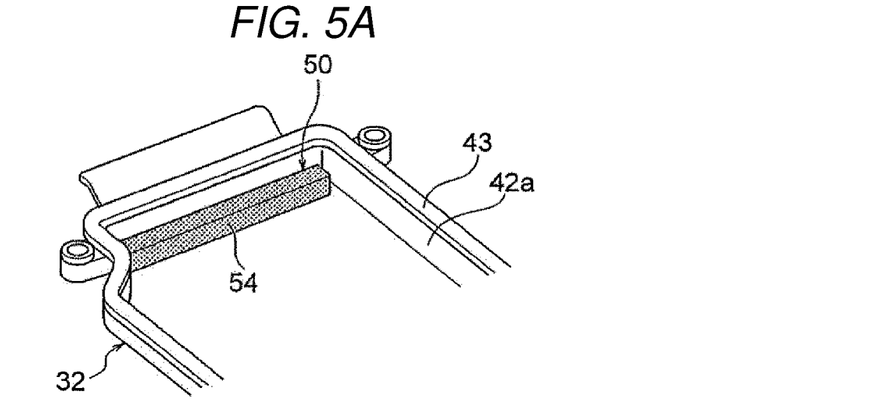
FIG. 5A is a perspective view illustrating an installation state of the sound absorber.

In the embodiment, the second duct part 42 is configured to be further dividable into a first duct element 42a and a second duct element 42b. The first duct element 42a is formed into a generally rectangular deep-dish shape, as illustrated in FIGS. 2 and 5A. The second duct element 42b is formed into a plate shape that closes an upper opening of the first duct element 42a. The two duct elements 42a and 42b are coupled with a seal member 43 interposed therebetween. The casing 24 of the electrical device 20 is placed on the second duct element 42b, while the heat dissipation fin 26 is accommodated in the second duct part 42 through the second duct element 42b. The electrical device 20 is placed on an upper surface of the second duct element 42b while being accommodated in the first duct element 42a.

The blower 60 is driven by a motor, not illustrated, and supplies air from the vehicle cabin to the electrical device 20 via the duct 30. In the embodiment, the blower 60 is disposed in the exhaust duct 34. Alternatively, the blower 60 may be disposed in the intake duct 32, or a plurality of blowers may be disposed in the duct 30.

The sound absorber 50 absorbs sound and exerts a muffling effect. For example, urethane foam, felt, or sponge can be used as such a sound absorber 50.

The sound absorber 50 is disposed on either one of an upstream side and a downstream side of the electrical device 20 in the duct 30, or disposed in each of the curved portions 32A and 34A. In the embodiment, an upstream sound absorber 51 is disposed in the first upstream curved portion 32A of the intake duct 32, and a downstream sound absorber 52 is disposed in the first downstream curved portion 34A of the exhaust duct 34. The sound absorber 50 may be disposed in the second or later closest curved portion to the electrical device 20 in each or one of the intake duct 32 and the exhaust duct 34. Furthermore, when each of the ducts 32 and 34 has a plurality of curved portions, the sound absorbers 50 may be disposed in the plurality of curved portions, respectively. When the sound absorbers 50 are disposed in the curved portions 32A and 34A closest to the electrical device 20 as in the embodiment, respectively, a sound absorbing effect of the sound absorbers 50 can be improved.

As illustrated in FIGS. 2 and 3, the sound absorbers 51 and 52 are disposed in fluid stagnation regions 70 and 72 where the flow of the air tends to stagnate in the curved portions 32A and 34A, respectively. In FIGS. 2 and 3, a mainstream of the air flowing in the duct 30 is denoted by white arrows. In general, more regions where the flow of the air stagnates hydrodynamically are generated in the curved portions 32A, 32B, and 34A of the duct 30 than regions where the duct 30 extends linearly. Providing the sound absorbers 50 in such fluid stagnation regions 70 and 72 can prevent the sound absorbers 50 from disturbing the flow of the air in the duct 30 when the blower 60 operates.

The fluid stagnation regions 70 and 72 are regions that are off the mainstream of the air flowing in the duct 30. In bent portions at a bending angle equal to or smaller than approximately 90 degrees, such as the curved portions 32A and 34A illustrated in FIGS. 2 and 3, the fluid stagnation regions 70 and 72 are generated near an inner wall surface of corners where the duct 30 is bent. When the curved portions 32A and 34A are present upstream of the blower 60 as in the embodiment, the fluid stagnation regions 70 and 72 are generated near the inner wall surface of the duct 30 on the outer side in a curvature radius direction in the bent portions of the duct 30. In the embodiment, the fluid stagnation regions 70 and 72 are regions where the air does not flow when the blower 60 blows the air, or regions where the flow of the air is a vortex flow, if any, and a flow rate of the air is not affected. The regions are so-called dead water regions (dead spaces) of fluid. When each or one of the sound absorbers 50 is disposed in the dead water region, part of the sound absorber 50 may be disposed outside the dead water region. Approximately 70% or more of a total volume of the sound absorber 50 is desirably in the dead water region. Furthermore, each sound absorber 50 and the heat dissipation fin 26 of the electrical device 20 are desirably disposed on a straight line passing through the duct 30 at least partially.

Next, an installation state of each sound absorber 50 will be described. FIG. 5A is a perspective view illustrating the installation state of the sound absorber 50 disposed in the intake duct 32. The sound absorber 50 is installed at a corner of an inner wall surface of the intake duct 32 on the outer side in the curvature radius direction in the bent portion of the intake duct 32, i.e., the first upstream curved portion 32A. In the embodiment, a cross-section of the duct 30 is formed into a generally rectangular shape in the first upstream curved portion 32A and the first downstream curved portion 34A of the duct 30. The sound absorber 50 is formed into a quadrangular prism shape and disposed so that one corner of the sound absorber 50 is along a corner of the first upstream curved portion 32A on the outer side in the curvature radius direction. The sound absorber 50 may be bonded to an inner wall surface of the curved portion 32A with, for example, an adhesive.

Figure 5B:
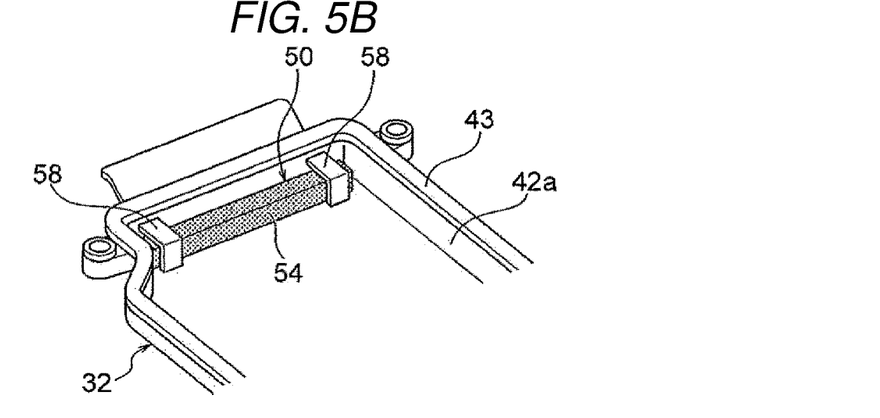
FIG. 5B is a perspective view illustrating another example of the installation state of the sound absorber.

FIG. 5B is a perspective view illustrating another example of the installation state of the sound absorber 50, i.e., the upstream sound absorber 51. In the example, both ends of the columnar sound absorber 50 are fixed to an inner wall of the duct 30 by fixtures 58. The fixtures 58 are each formed into a generally L shape along a surface shape of the sound absorber 50. By fixing the sound absorber 50 with the fixtures 58 in this way, it is possible to prevent the sound absorber 50 from coming off even with a high volume of air and provide a high durability structure.

Similarly to the examples illustrated in FIGS. 5A and 5B, the sound absorber 50 disposed in the exhaust duct 34 can be fixedly installed on an inner wall surface of the exhaust duct 34 with the adhesive or the fixtures 58. Furthermore, in the embodiment, the second duct part 42 where the sound absorbers 50 are disposed is configured with the two separable duct elements 42a and 42b. With the configuration, the sound absorbers 50 can be easily attached to the corners of the curved portions 32A and 34A with the duct elements 42a and 42b separated.

In the noise suppression structure 10 described above, the sound absorbers 50 are disposed in the fluid stagnation regions 70 and 72 where the flow of the air tends to stagnate hydrodynamically in the first upstream curved portion 32A and the first downstream curved portion 34A of the duct 30, respectively. Therefore, when the electrical device 20 is air-cooled, the mainstream of the air flowing in the duct 30 is not disturbed by the provision of the sound absorbers 50. This makes it possible to efficiently feed the air to the electrical device 20 and keep a high cooling performance of the cooling system 12.

Moreover, in the embodiment, the curved portions 32A and 34A where the sound absorbers 50 are disposed are the bent portions, and the sound absorbers 50 are disposed in the dead water regions of fluid where the air does not flow hydrodynamically in the bent portions. It is, therefore, possible to prevent the sound absorbers 50 from disturbing the flow of the air in the duct 30 and keep a high cooling performance.

Furthermore, the high-frequency noise at short wavelengths has characteristics of high linearity. Therefore, by providing the sound absorbers 50 in the first upstream curved portion 32A and the first downstream curved portion 34A each at a smallest distance from the electrical device 20 through the duct 30, it is possible to effectively absorb the high-frequency noise propagated straight from the electrical device 20 through the duct 30.

Moreover, in the noise suppression structure 10 described above, the sound absorbers 50 are disposed in the existing curved portions 32A and 34A of the duct 30, and it is unnecessary to additionally provide recessed portions for accommodating the sound absorbers 50 in the duct 30. Thus, this noise suppression structure 10 can improve space efficiency in a vehicle body when components are mounted, without an increase in duct accommodation space.

Furthermore, in the noise suppression structure 10 described above, the duct 30 is configured to be dividable into a plurality of components near the curved portions 32A and 34A where the sound absorbers 50 are disposed. Owing to this, assembly workers can easily place the sound absorber 50 at the corner of the curved portion 32A of the second duct part 42 while, for example, the duct 30 is divided into the first duct part 41 and the second duct part 42. Moreover, this sound absorber 50 is disposed at the position apart from the end opening of the second duct part 42 by the length equal to or greater than the predetermined length L, and not disposed in a region where the first duct part 41 is fitted into the second duct part 42. This can facilitate coupling work of coupling the two duct parts 41 and 42, without interference of the sound absorber 50.

Figure 6A:
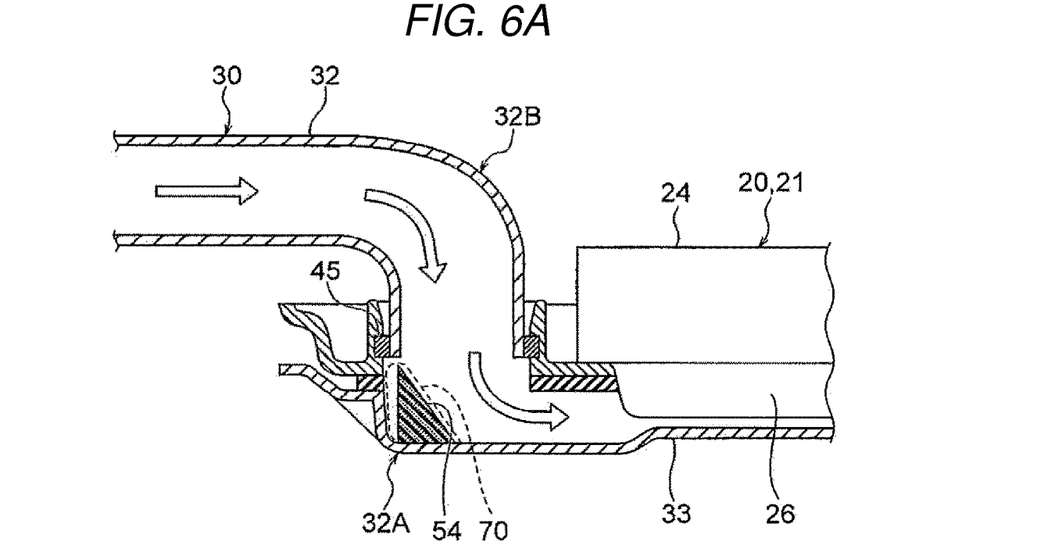
FIG. 6A is a cross-sectional view illustrating principal components of the noise suppression structure to illustrate another example of the sound absorber.
Figure 6B:
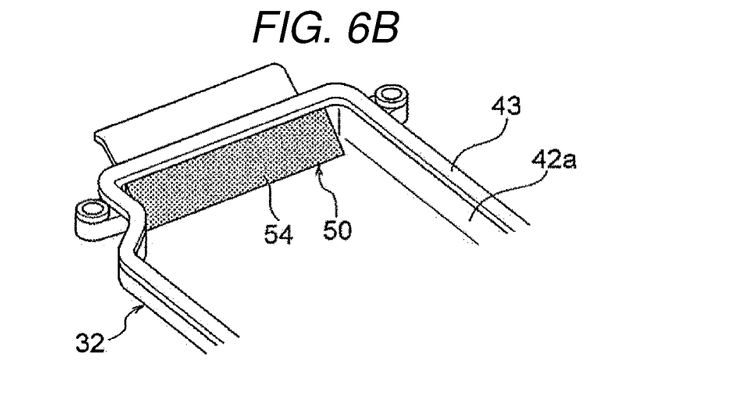
FIG. 6B is a perspective view illustrating an installation state of the sound absorber.

Another example of the sound absorber 50 will next be described. FIG. 6A similar to FIG. 2 is a cross-sectional view illustrating principal members of the noise suppression structure 10 and another example of the sound absorber 50. FIG. 6B, similar to FIG. 5A is a perspective view illustrating the installation state of the sound absorber 50 illustrated in FIG. 6A. A sound absorbing surface of the sound absorber 50 in the example that absorbs the high-frequency noise generated from the electrical device 20 is inclined with respect to the extension direction of the duct 30. When the sound absorber 50 is disposed in the bent portion closest to the electrical device 20, the sound absorbing surface is a surface 54 facing the electrical device 20 (hereinafter also referred to as a "facing surface 54"). This facing surface 54 is the inclined surface inclined with respect to the extension direction of the duct 30 that extends linearly from the electrical device 20 to the bent portion of the duct 30. The sound absorber 50 is installed so that the bent corner of the intake duct 32 has a chamfered shape.

In the noise suppression structure 10 using the sound absorbers 50 in the example, the facing surface 54 of each sound absorber 50 that faces the electrical device 20, i.e., the surface 54 from which the high-frequency noise traveling straight through the duct 30 enters the sound absorber 50 is the inclined surface inclined with respect to the advancing direction of the high-frequency noise. Owing to this, it is possible to increase an area of the surface 54 that the high-frequency noise enters, as compared with an area of the facing surface 54 of the sound absorber 50 that is perpendicular to the advancing direction of the high-frequency noise as in the embodiment illustrated in FIG. 2. The larger the area of the surface that the high-frequency noise enters is, the greater the sound absorbing effect of the sound absorber 50 is. Therefore, forming the facing surface 54 as an inclined surface enables an increase in the area and an improvement in the sound absorbing effect. In the sound absorber 50 illustrated in FIGS. 2 and 6A, it is possible to provide a plurality of irregularities in the facing surface 54 to increase the area of the facing surface 54 that faces the electrical device 20.

The noise suppression structure 10 according to another embodiment will next be described with reference to FIG. 7. In the embodiment, the sound absorber 50 is disposed in either one of the intake duct 32 and the exhaust duct 34. The one of the ducts is the duct having a smaller distance to passenger seats 81 and 82 in the vehicle cabin from the end opening of the duct 30 defining the intake port 30a or the exhaust port 30b.

When the exhaust port 30b is disposed, for example, outside the vehicle cabin, the intake port 30a has a smaller distance to the passenger seat 81 than the exhaust port 30b. Therefore, the sound absorber 50 is disposed in the first upstream curved portion 32A of the intake duct 32.

Figure 7:
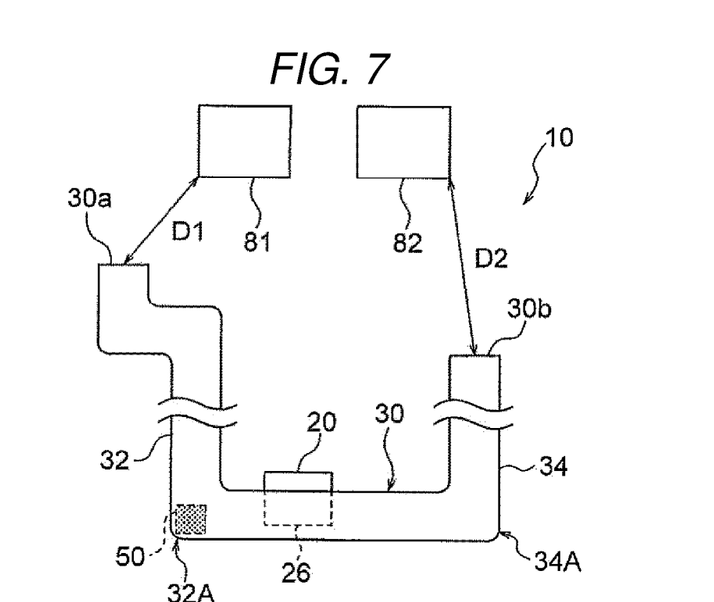
FIG. 7 is a schematic diagram illustrating a noise suppression structure according to an embodiment.

On the other hand, as illustrated in FIG. 7, when both the intake port 30a and the exhaust port 30b are disposed in the vehicle cabin, then a distance D1 to the passenger seat 81 closest to the intake port 30a is compared with a distance D2 to the passenger seat 82 closest to the exhaust port 30b, and the sound absorber 50 is disposed in the duct having a smaller distance. In FIG. 7, distance D1<distance D2, so that the sound absorber 50 is disposed in the first upstream curved portion 32A of the intake duct 32 having a smaller distance to the passenger seat 81. When distance D1>distance D2, the sound absorber 50 is disposed in the first downstream curved portion 34A of the exhaust duct 34.

The high-frequency noise propagated in the duct 30 is released outside from the intake port 30a and the exhaust port 30b of the duct 30 and propagated to the ears of a passenger in the vehicle cabin. Therefore, the smaller the distance from the end opening of the duct 30 defining the intake port 30a or the exhaust port 30b to the passenger seat 81 or 82 is, the more likely the high-frequency noise is to reach the ears of a passenger seated in the passenger seat 81 or 82. Therefore, by providing the sound absorber 50 in one of the intake duct 32 and the exhaust duct 34 whose end opening is closer to the passenger seat 81 or 82, it is possible to effectively suppress the high-frequency noise that may cause noise to the passenger. Furthermore, since the sound absorber 50 is disposed in either one of the intake duct 32 and the exhaust duct 34, it is possible to reduce the manufacturing cost.

Figure 8:
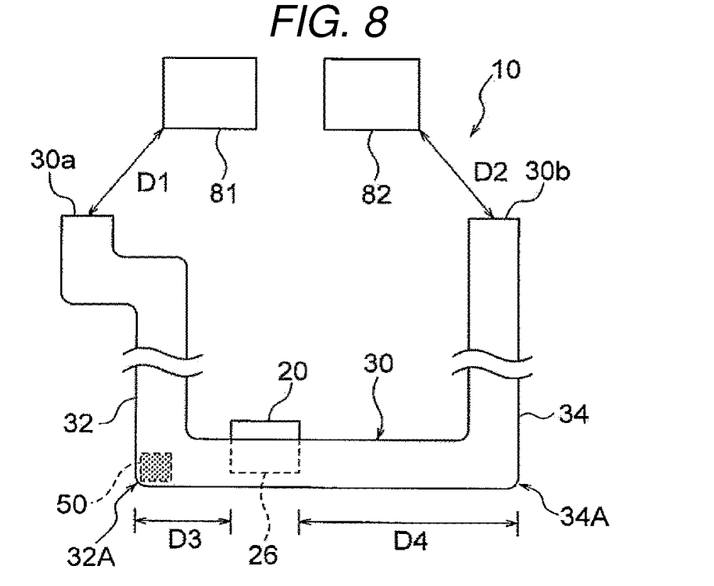
FIG. 8 is a schematic diagram illustrating a noise suppression structure according to an embodiment.

The noise suppression structure 10 according to still another embodiment will next be described with reference to FIG. 8. In the embodiment, the intake port 30a and the exhaust port 30b of the duct 30 are disposed in the vehicle cabin, and the distance D1 from the intake port 30a to the passenger seat 81 is set almost equal to the distance D2 from the exhaust port 30b to the passenger seat 82. The sound absorber 50 is disposed in either one of the intake duct 32 and the exhaust duct 34.

In the embodiment, one of the ducts where the sound absorber 50 is disposed is the duct having a smaller distance D3 or D4 to the curved portion 32A or 34A of the duct 30 closest to the electrical device 20. In the example illustrated in FIG. 8, when comparing the distance D3 from the electrical device 20 to the first upstream curved portion 32A with the distance D4 from the electrical device 20 to the first downstream curved portion 34A, the distance D3 is smaller than the distance D4. Therefore, the sound absorber 50 is disposed in the first upstream curved portion 32A of the intake duct 32 having a smaller distance. When distance D3>distance D4, the sound absorber 50 is disposed in the first downstream curved portion 34A of the exhaust duct 34.

The sound absorber 50 has a higher sound absorbing effect when absorbing sound near a source of generation of the high-frequency noise. Owing to this, as illustrated in FIG. 8, when the distance D1 from the intake port 30a to the passenger seat 81 is almost equal to the distance D2 from the exhaust port 30b to the passenger seat 82, then the sound absorber 50 is disposed in the duct at a smaller distance from the electrical device 20 to the curved portion 32A or 34A, and the high-frequency noise can be efficiently absorbed.

The disclosure is not limited to the embodiments described above and various changes and modifications can be made without departing from the spirit of the disclosure.

The noise suppression structure in the cooling system for the electrical device according to the disclosure can effectively absorb the high-frequency noise while maintaining a cooling performance, reduce the increase in manufacturing cost, and improve space efficiency when components are mounted.

The invention claimed is:

1. A noise suppression structure to be mounted on a cooling system for an electrical device of a vehicle, the noise suppression structure comprising:
    a duct that extends from inside a vehicle cabin of the vehicle to inside the vehicle cabin or outside the vehicle cabin through the electrical device;
    a blower configured to draw air from the vehicle cabin into the duct and feed the air to the electrical device; and
    a sound absorber disposed in the duct, wherein
    the duct has a curved portion where an extension direction of the duct changes, the curved portion being located on one of or each of an upstream side and a downstream side of the electrical device, and
    the sound absorber is disposed in a fluid stagnation region of the duct where a flow of the air has a likelihood to stagnate in the curved portion comprising an angled bent portion.

2. The noise suppression structure according to claim 1, wherein
    the curved portion where the sound absorber is disposed is the angled bent portion where the duct is bent, and
    the sound absorber is disposed near an inner wall surface of the duct on an outer side in a curvature radius direction of the angled bent portion.

3. The noise suppression structure according to claim 2, wherein
    a sound absorbing surface of the sound absorber that absorbs high-frequency noise to be generated from the electrical device is inclined with respect to the extension direction of the duct, and
    the angled bent portion includes at least a straight line forming the angled bent portion.

4. The noise suppression structure according to claim 3, wherein
    the duct comprises an intake duct that is located upstream of the electrical device and an exhaust duct that is located downstream of the electrical device,
    the sound absorber is disposed in either one of the intake duct and the exhaust duct, and
    an end opening of the either one of the intake duct and the exhaust duct is nearer to a passenger seat of the vehicle than an end opening of another of the intake duct and the exhaust duct, the end opening of the intake duct is being an intake port, the end opening of the exhaust duct being an exhaust port.

5. The noise suppression structure according to claim 4, wherein
    in a case where the end opening of the intake duct and the end opening of the exhaust duct has a substantially same distance to the passenger seat, the either one of the intake duct and the exhaust duct is nearer to the curved portion closest to the electrical device, and the sound absorber is disposed in the curved portion closest to the electrical device.

6. The noise suppression structure according to claim 2, wherein
    the duct comprises an intake duct that is located upstream of the electrical device and an exhaust duct that is located downstream of the electrical device,
    the sound absorber is disposed in either one of the intake duct and the exhaust duct, and
    an end opening of the either one of the intake duct and the exhaust duct is nearer to a passenger seat of the vehicle than an end opening of another of the intake duct and the exhaust duct, the end opening of the intake duct is being an intake port, the end opening of the exhaust duct being an exhaust port.

7. The noise suppression structure according to claim 6, wherein
    in a case where the end opening of the intake duct and the end opening of the exhaust duct has a substantially same distance to the passenger seat, the either one of the intake duct and the exhaust duct is nearer to the curved portion closest to the electrical device, and the sound absorber is disposed in the curved portion closest to the electrical device.

8. The noise suppression structure according to claim 1, wherein
    the duct comprises an intake duct that is located upstream of the electrical device and an exhaust duct that is located downstream of the electrical device,
    the sound absorber is disposed in either one of the intake duct and the exhaust duct, and
    an end opening of the either one of the intake duct and the exhaust duct is nearer to a passenger seat of the vehicle than an end opening of another of the intake duct and the exhaust duct, the end opening of the intake duct is being an intake port, the end opening of the exhaust duct being an exhaust port.

9. The noise suppression structure according to claim 8, wherein
    in a case where the end opening of the intake duct and the end opening of the exhaust duct has a substantially same distance to the passenger seat, the either one of the intake duct and the exhaust duct is nearer to the curved portion closest to the electrical device, and the sound absorber is disposed in the curved portion closest to the electrical device.

10. The noise suppression structure according to claim 1, wherein the sound absorber is disposed on the fluid stagnation region that is disposed in the angled bent portion of the curved portion of the duct.

11. The noise suppression structure according to claim 1, wherein the sound absorber is disposed in the fluid stagnation region that is off a mainstream of the flow of air in the duct.

12. The noise suppression structure according to claim 1, wherein the sound absorber is disposed in either one of an intake or an exhaust part of the duct, and
    wherein the sound absorber is configured to with at least one flat surface disposed so that one corner of the sound absorber is along the curved portion of the duct.

13. The noise suppression structure according to claim 1, wherein the sound absorber is disposed in the fluid stagnation region where the flow of the air stagnates hydrodynamically in an upstream curved portion and a downstream curved portion of the curved portion of the duct, and
    wherein the curved portion where an angled corner of the sound absorber is disposed is the angled bent portion.

14. The noise suppression structure according to claim 1, wherein the sound absorber is disposed in the fluid stagnation region, which is where the air does not flow when the blower blows the air, or where the flow of the air is a vortex flow, if any, and a flow rate of the air is not affected.

15. The noise suppression structure according to claim 1, where the sound absorber is disposed adjacent to an inner wall surface of corners where the duct is bent.

16. The noise suppression structure according to claim 1, where the sound absorber is disposed adjacent to an inner wall surface of corners where the duct is bent at a substantially right angle for the angled bent portion.

17. The vehicle comprising the noise suppression structure according to claim 1.

18. A noise suppression structure mounted on a cooling system for an electrical device of a vehicle, the noise suppression structure comprising:
   a duct that extends from inside a vehicle cabin of the vehicle to inside the vehicle cabin or outside the vehicle cabin through the electrical device;
   a blower configured to draw air from the vehicle cabin into the duct and feed the air to the electrical device; and
   a sound absorber disposed in the duct, wherein
   the duct has a first portion where an extension direction of the duct changes, the first portion being located on one of or each of an upstream side and a downstream side of the electrical device, and
   wherein the sound absorber is disposed in an angled bent portion of the first portion where a flow of the air stagnates in the first portion, the angled bent portion is bent on a straight line at a predetermined angle.

19. The noise suppression structure according to claim 18, wherein
   the first portion where the sound absorber is disposed in the angled bent portion where the duct is bent at substantially a right angle, and
   the sound absorber is disposed near an inner wall surface of the duct on an outer side in a curvature radius direction of the bent portion.

20. The noise suppression structure according to claim 19, wherein
   a sound absorbing surface of the sound absorber that absorbs high-frequency noise to be generated from the electrical device is inclined with respect to the extension direction of the duct,
   wherein the sound absorber is configured to with at least one flat surface disposed so that one corner of the sound absorber is along the curved portion of the duct, and
   wherein the curved portion where an angled corner of the sound absorber is disposed is the angled bent portion.

* * * * *